United States Patent
Aftanas et al.

(10) Patent No.: US 6,779,696 B2
(45) Date of Patent: Aug. 24, 2004

(54) ARTICLE CARRIER HAVING SINGLE SIDED RELEASABLE CROSS BAR

(75) Inventors: Jeffrey M. Aftanas, Ortonville, MI (US); Donald R. Potter, Clarkston, MI (US); Gordon E. Michie, Windsor (CA); Lambert F. Sellers, Brown City, MI (US)

(73) Assignee: JAC Products, Inc., Saline, MI (US)

( * ) Notice: Subject to any disclaimer, the term of this patent is extended or adjusted under 35 U.S.C. 154(b) by 119 days.

(21) Appl. No.: 09/971,838

(22) Filed: Oct. 5, 2001

(65) Prior Publication Data

US 2003/0066852 A1 Apr. 10, 2003

(51) Int. Cl.$^7$ .................................................. B60R 9/00
(52) U.S. Cl. ........................ 224/315; 224/321; 224/325
(58) Field of Search .................................. 224/321, 325, 224/326; 410/104, 105, 315

(56) References Cited

U.S. PATENT DOCUMENTS

| | | |
|---|---|---|
| 2,663,472 A | 12/1953 | Belgau |
| 2,688,504 A | 9/1954 | Parker |
| 2,888,178 A | 5/1959 | Olson |
| 3,165,353 A | 1/1965 | Weise |
| 3,212,457 A | 10/1965 | Looker |
| 3,241,501 A | 3/1966 | Watts |
| 3,399,635 A | 9/1968 | Heard |
| 3,776,437 A | 12/1973 | Carney |
| 4,020,769 A | 5/1977 | Keir |
| 4,085,684 A | 4/1978 | McLennan |
| 4,099,658 A | 7/1978 | Bott |
| 4,133,465 A | 1/1979 | Bott |
| 4,162,755 A | 7/1979 | Bott |
| 4,182,471 A | 1/1980 | Bott |
| 4,256,424 A | 3/1981 | Knox et al. |
| 4,274,570 A | 6/1981 | Bott |
| 4,294,388 A | 10/1981 | Wünstel |
| 4,295,587 A | 10/1981 | Bott |
| 4,323,182 A | 4/1982 | Bott |
| 4,364,500 A | 12/1982 | Bott |
| 4,396,175 A | 8/1983 | Long et al. |
| 4,431,123 A | 2/1984 | Bott |
| 4,448,337 A | 5/1984 | Cronce |
| 4,473,178 A | 9/1984 | Bott |
| 4,493,470 A | 1/1985 | Engel |
| 4,496,271 A | 1/1985 | Spinosa et al. |

(List continued on next page.)

FOREIGN PATENT DOCUMENTS

WO     WO 97/19832     6/1997

*Primary Examiner*—Nathan J. Newhouse
(74) *Attorney, Agent, or Firm*—Harness Dickey & Pierce P.L.C.

(57) ABSTRACT

An article carrier for a motor vehicle having a cross bar with a pair of end supports at each end, where each end support can be simultaneously locked or unlocked by lifting an actuating member of either end support. A principal advantage of the construction of the end supports is that the actuating member thereof can be urged between its locked and unlocked positions without protruding significantly from the end support, and therefore without requiring a significant degree of clearance between the end support and the outer body surface of the vehicle. Thus, the cross bar can be placed closer to the outer body surface of the vehicle while still allowing the actuating member of each end support to be articulated between its locked and unlocked positions.

24 Claims, 5 Drawing Sheets

U.S. PATENT DOCUMENTS

| | | |
|---|---|---|
| 4,500,020 A | 2/1985 | Rasor |
| 4,509,888 A | 4/1985 | Sheek |
| 4,516,710 A | 5/1985 | Bott |
| 4,684,048 A | 8/1987 | Bott |
| 4,688,843 A | 8/1987 | Hall |
| 4,708,549 A | 11/1987 | Jensen |
| 4,722,646 A | 2/1988 | McIntyre |
| 4,754,905 A | 7/1988 | Bott |
| 4,768,691 A | 9/1988 | Stapleton |
| 4,771,969 A | 9/1988 | Dowd |
| 4,877,168 A | 10/1989 | Bott |
| 4,899,917 A | 2/1990 | Bott |
| 4,967,945 A | 11/1990 | Bott |
| 4,972,983 A | 11/1990 | Bott |
| 4,982,886 A | 1/1991 | Cucheran |
| D314,541 S | 2/1991 | Bott |
| D317,744 S | 6/1991 | Bott |
| 5,082,158 A | 1/1992 | Bott |
| 5,104,019 A | 4/1992 | Bott |
| 5,133,490 A | 7/1992 | Cucheran |
| 5,143,267 A | 9/1992 | Cucheran et al. |
| 5,158,425 A | 10/1992 | Bott |
| 5,190,198 A * | 3/1993 | Cucheran ............ 224/321 |
| 5,226,570 A | 7/1993 | Pedrini |
| 5,423,465 A | 6/1995 | Kauka et al. |
| 5,456,512 A * | 10/1995 | Gibbs et al. ............ 296/37.7 |
| 5,472,256 A | 12/1995 | Tucker |
| 5,588,572 A | 12/1996 | Cronce et al. |
| 5,715,980 A | 2/1998 | Blankenburg et al. |
| 5,924,614 A * | 7/1999 | Kuntze et al. ............ 224/321 |
| 5,931,359 A * | 8/1999 | Zona ............ 224/321 |
| 6,050,467 A * | 4/2000 | Drouillard et al. ............ 224/321 |
| 6,068,169 A | 5/2000 | Aftanas |
| 6,112,964 A | 9/2000 | Cucheran et al. |
| 6,131,782 A * | 10/2000 | De Silva et al. ............ 224/321 |

* cited by examiner

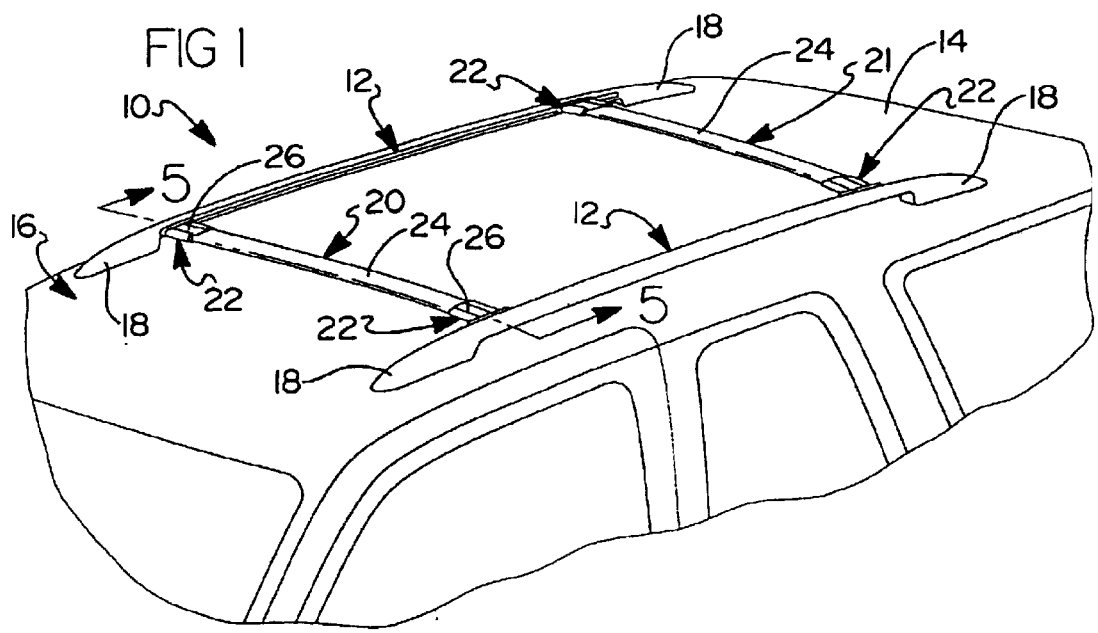
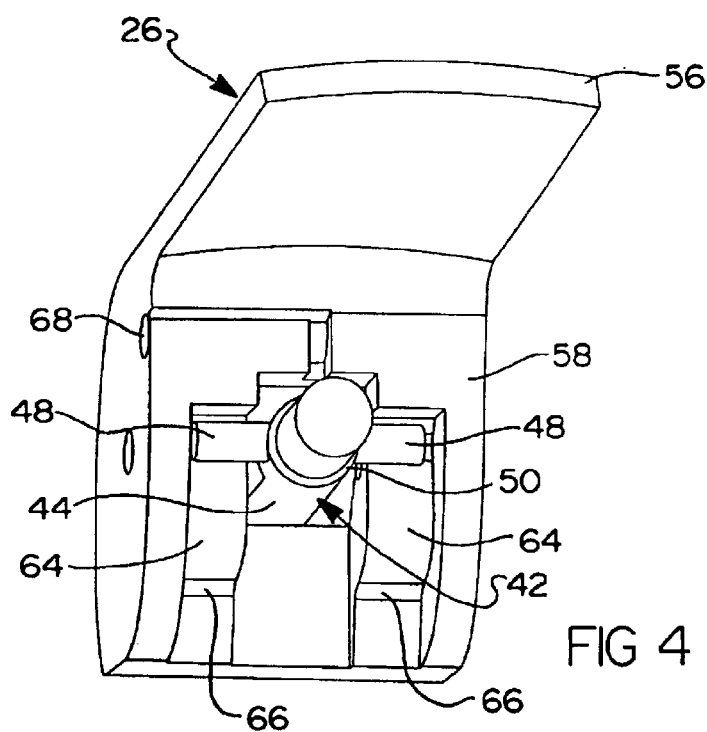

ARTICLE CARRIER HAVING SINGLE SIDED RELEASABLE CROSS BAR

FIELD OF THE INVENTION

This invention relates to vehicle article carriers, and more particularly to a vehicle article carrier incorporating a locking mechanism which allows a user to simultaneously place both bracket members of the article carrier in locked and unlocked positions by manually engaging a single actuating member at one side of the vehicle article carrier, and without interfering with the roof of the vehicle during manipulation of the actuating member.

BACKGROUND OF THE INVENTION

Vehicle article carriers are used in a wide variety of applications to transport a variety of articles above an outer body surface of the vehicle. Such vehicle article carriers typically include a pair of slats or elevated siderails which are fixedly mounted to the outer body surface of the vehicle, a pair of bracket members slidably disposed at ends of the slats or siderails, and a cross bar disposed between the bracket members so as to be supported above the outer body surface by the bracket members. In some applications two cross bars are employed, with the second cross bar being secured either fixedly to the slats or siderails, or being adjustably secured via its own pair of bracket members disposed slidably upon the slats or siderails.

Each bracket member used in most vehicle article carrier systems typically includes some form of locking mechanism with an actuating member for placing the locking mechanism in a locked or unlocked position. When the locking mechanism of each bracket member is in its unlocked position, both bracket members may be moved slidably along the slats or siderails to allow the cross bar therebetween to be repositioned as desired along the slats. The obvious drawback to this arrangement is that when the user desires to reposition the cross bar, first one of the bracket members must be unlocked and then the user must walk around to the opposite side of the vehicle to unlock the other bracket member. Once the cross bar has been moved to its desired position by the user, the user must manually place both of the bracket members in their locked positions. Thus, the user is presented with the inconvenience of separately locking and unlocking two bracket members whenever the cross bar is to be repositioned.

Some manufacturers of vehicle article carriers have attempted to address this problem by providing means for simultaneously locking and unlocking each bracket member via a single actuating mechanism. One such article carrier is disclosed in U.S. Pat. No. 5,190,198 to Cucheran, assigned to the assignee of the present application. Other forms of single-side releasable mechanisms are disclosed in U.S. Pat. No. 6,112,964 to Cucheran et al. The disclosures of each of these patents are hereby incorporated by reference into the present application.

While the single-side releasable crossbars disclosed in the above-referenced patents have proven to be successful and satisfactory for their intended uses, in some applications where a siderail is employed, there is very little clearance between the underside of the bracket mechanism at each end of the cross bar and the outer body surface of the vehicle. This necessitates a form of actuating member which can be opened and closed without interference with the outer body surface of the vehicle roof.

Accordingly, it would be highly desirable to provide a vehicle article carrier which incorporates a means for simultaneously locking and unlocking both bracket members from their respective slats, as well as a means for holding both bracket members in their unlocked positions once the bracket members are urged into an unlocked orientation. It would be further be highly desirable to provide such a bracket member which includes an actuating member which can be moved pivotably between locked and unlocked positions by a user without interfering with the outer body surface of the vehicle.

SUMMARY OF THE INVENTION

The above and other objects are provided by a vehicle article carrier apparatus having a single-sided release mechanism in accordance with preferred embodiments of the present invention. The apparatus generally includes a pair of siderails which are adapted to be fixedly secured to an outer body surface of a vehicle. The siderails are secured in a spaced apart, generally parallel configuration on the outer body surface of the vehicle. At least one cross bar, and more preferably a pair of cross bars, are supported span-wise between the siderails. A bracket member is disposed at each end of at least one of the cross bars which allows the cross bar to be repositioned along the siderails as may be needed.

In one preferred embodiment each bracket member further includes a locking pin which is disposed for linear, sliding movement within a housing portion of the bracket member. The locking finger is adapted to engage within one of a plurality of predefined, spaced apart openings in the siderail to allow the bracket member to be supported at a desired position along the siderails. A biasing member continuously biases a locking pin toward engagement with one of the predefined openings in the siderail. The locking pin also includes at least one transversely extending post which forms a cam follower surface, and an elongated slot.

The housing further includes an actuating member which is supported pivotally relative to the housing so that it may be easily grasped by a user with one or more fingers and moved between locked and unlocked positions. The actuating member includes at least one camming surface adapted to engage with the post on the locking pin to urge the locking pin away from the siderail when the actuating member is moved into an unlocked position. Moving the actuating member into a locked position allows a biasing element associated with the locking pin to urge the locking pin toward and into engagement with the slat.

It is a principal advantage of the bracket mechanism of the present invention that the actuating member requires very little clearance when moved between its locked and unlocked positions. This allows the cross bar to be supported closer to the outer body surface of the vehicle without interfering with use of the actuating member. Allowing the cross bar to be supported closer to the outer body surface provides a more aerodynamic article carrier assembly and can potentially reduce wind noise and aerodynamic drag which might otherwise be caused by the cross bar being positioned at a height significantly above the outer body surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a portion for a vehicle showing a preferred embodiment of the present invention secured to the outer body surface;

FIG. 4 is a perspective view of just the actuating member.

DETAILED DESCRIPTION OF THE PREFERRED EMBODIMENTS

The following description of the preferred embodiment(s) is merely exemplary in nature and is in no way intended to limit the invention, its application, or uses.

Figure 2:
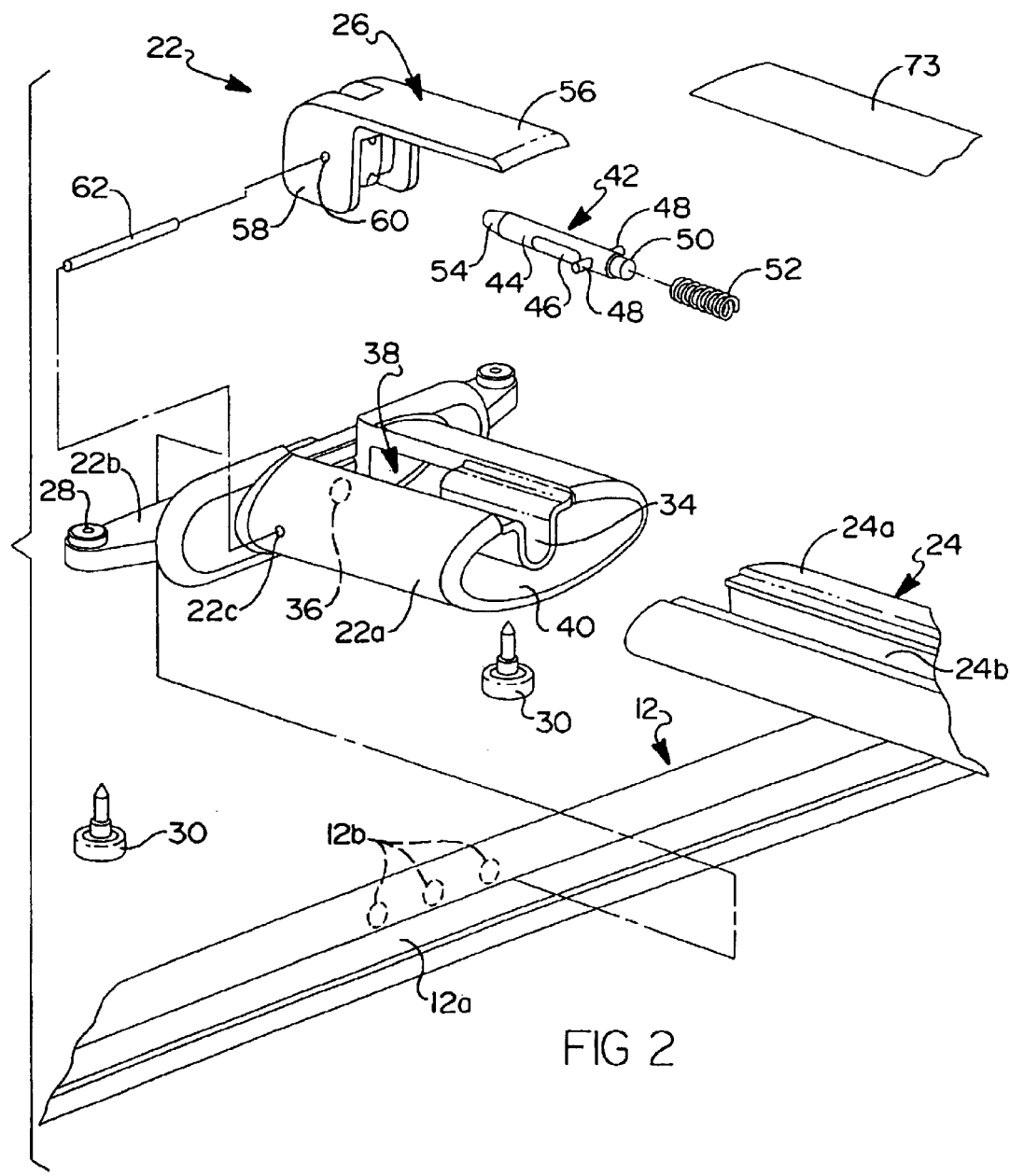
FIG. 2 is an exploded perspective view of the bracket mechanism of the present invention and a portion of one cross bar to which the bracket mechanism is secured to support the cross bar from the siderail.

Referring to FIGS. 1 and 2, there is shown a vehicle article carrier 10 in accordance with a preferred embodiment of the present invention. The vehicle article carrier 10 includes a pair of siderails 12 (FIG. 1) which are disposed generally parallel to one another and which are supported above an outer body surface 14 of a motor vehicle 16. Each siderail 12 is supported at its opposite ends by a pair of mounting feet 18 and each includes a channel 12a (better visible in FIG. 2) having a plurality of spaced apart openings 12b. The openings 12b are indicated in phantom in FIG. 2. The mounting feet 18 are all securely affixed to the outer body surface 14 via conventional fasteners such as rivnuts.

The article carrier 10 further includes at least one cross bar 20 which may be adjustably positioned along the siderails 12. Preferably, a second adjustable cross bar 21 is also provided. Cross bar 21 is shown as being identical to cross bar 20, but it will be appreciated that a fixed cross bar could be substituted for adjustable cross bar 21. Since cross bars 20 and 21 are identical, reference only to cross bar 20 will be made when describing the construction and components of each of the cross bars 20 and 21.

The cross bar 20 includes an end support 22 at each end thereof which supports a cross bar member 24 therebetween above the outer body surface 14. Each of the end supports 22 further include a user engageable actuating member 26. The actuating member 26 allows both end supports 22 to be simultaneously locked or unlocked from the siderails 12 by unlocking only one of the actuating members 26. This operation will be described in greater detail in the following paragraphs.

Figure 3:
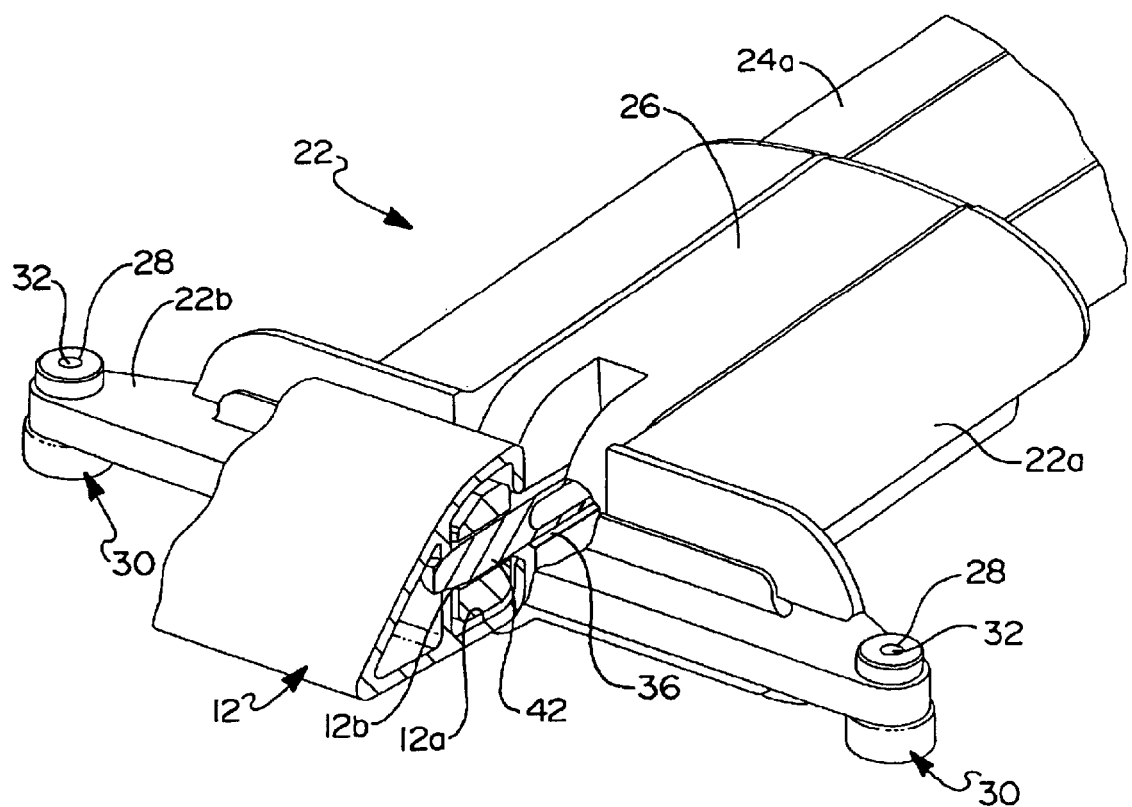
FIG. 3 is a perspective view of the bracket member with a portion of the side rail shown in phantom.

Referring to FIGS. 2 and 3, one of the end supports 22 is shown in greater detail. End support 22 includes a housing 22a having a base portion 22b integrally formed therewith. Base portion 22b includes a pair of bores 28 each adapted to receive a shaft 32 of a guide wheel 30 therein. The guide wheels 30 help to guide the base portion 22b within the channel 12a of its associated siderail 12 such that the entire housing 22a can be moved slidably along the siderail when the actuating member 26 is in its unlocked position.

The housing 22a further includes a channel or trough 34 which is in communication with an opening 36 (FIG. 3) in the base portion 22b. An open area 38 separates the channel 34 from the base portion 22b. A distal end 24a of cross bar member 24 is received within an opening 40 (FIG. 2) of the housing 22a and is secured therein preferably via one or more threaded fasteners (not shown) in conventional fashion.

With further reference to FIG. 2, the locking pin 42 includes a generally cylindrical body 44 having an elongated slot 46 and a pair of oppositely extending post portions 48. A shoulder 50 abuts one end of a spring 52 when the end support 22 is assembled such that the end support can be biased continuously towards its associated siderail 12. A tapered nose 54 of the locking pin 42 further eases insertion of the locking pin into one of the openings 12b in the siderail 12.

Referring further to FIGS. 2 and 4, the actuating member 26 will now be described. The actuating member 26 is retained to the housing via a pivot pin which includes a manually graspable end portion 56 and a main body portion 58. The main body portion 58 includes a bore 60 through which a pivot pin 62 is inserted. The pivot pin 62 further extends through an opening 22c (FIG. 2) in the housing 22a, and the slot 46 in the locking pin 42 when the end support 22 is fully assembled. With specific reference to FIG. 4, the main body portion 58 includes a pair of spaced apart camming surfaces 64 which each have a detent recess 66.

Figure 5:
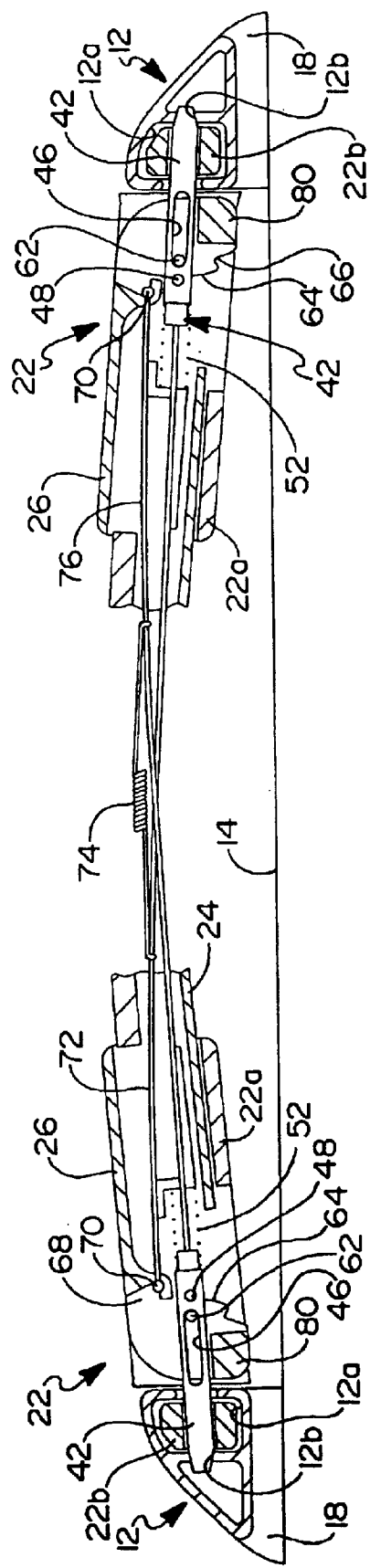
FIG. 5 is a simplified, side cross sectional view taken in accordance with section line 5—5 in FIG. 1 showing the actuating members at each end of the cross bar in their locked positions.

Referring now to FIGS. 4 and 5, the actuating member 26 can also be seen to include an attachment portion 68 which forms a pocket within which an enlarged end 70 of a cable 72 can be trapped. From FIG. 5 it can be seen that cable 72 is also coupled to the locking pin 42 of the opposite end support 22. The cable 72 extends within the channel 24b of the cross bar member 24 and is concealed underneath a support strip 73 which is placed over the channel portion 24b of the cross bar member 24 during final assembly of the cross bar 20. The opposite actuating member 26 similarly includes a cable 76 coupled to the locking pin 42 of the leftmost actuating member 26 in the drawing of FIG. 5. Cable 76 is likewise disposed in within channel 24 when the cross bar 20 is fully assembled. Cable 76 is secured to cable 72 by a spring 74 which helps to maintain tension in each of the cables.

During operation, when the actuating members 26 are both in their locked positions (FIG. 5), the spring 52 associated with each end support 22 biases its associated locking pin 42 into engagement with one of the openings 12b in an associated one of the siderails 12. When the cross bar 20 is to be adjustably positioned on the siderails 12, the user grasps the end portion 56 of one or the other of the actuating members 26 and lifts upwardly to urge the member 26 into the position shown in FIG. 6. The post portions 48 of the locking pin 42 associated with the actuating member 26 being unlocked rides over the camming surfaces 64 until seating within the detent recesses 66. When this position is reached, the user may release the actuating member 26 and the member will remain in the unlocked position shown in FIG. 6. As the member 26 is urged into this position, it pivots about pivot pin 62. The elongated slot 46 allows the locking pin 42 to move linearly into engagement with one of the openings 12b in the siderail 12.

It is a principal advantage of the present invention that the pivoting movement of the actuating member 26 is accomplished without an outer surface 80 of the actuating member 26 being forced to protrude significantly outwardly of the housing 22a of the end support 22. Thus, the end support 22 can be used to support a cross bar closely adjacent an outer surface of a vehicle without experiencing interference with the outer surface as the actuating member 26 is moved between its locked and unlocked positions. Thus, an even lower profile, more aerodynamic article carrier can be constructed because of the ability of the actuating member 26 to be opened and closed without requiring significant clearance between it and an outer body surface of the vehicle.

Figure 6:
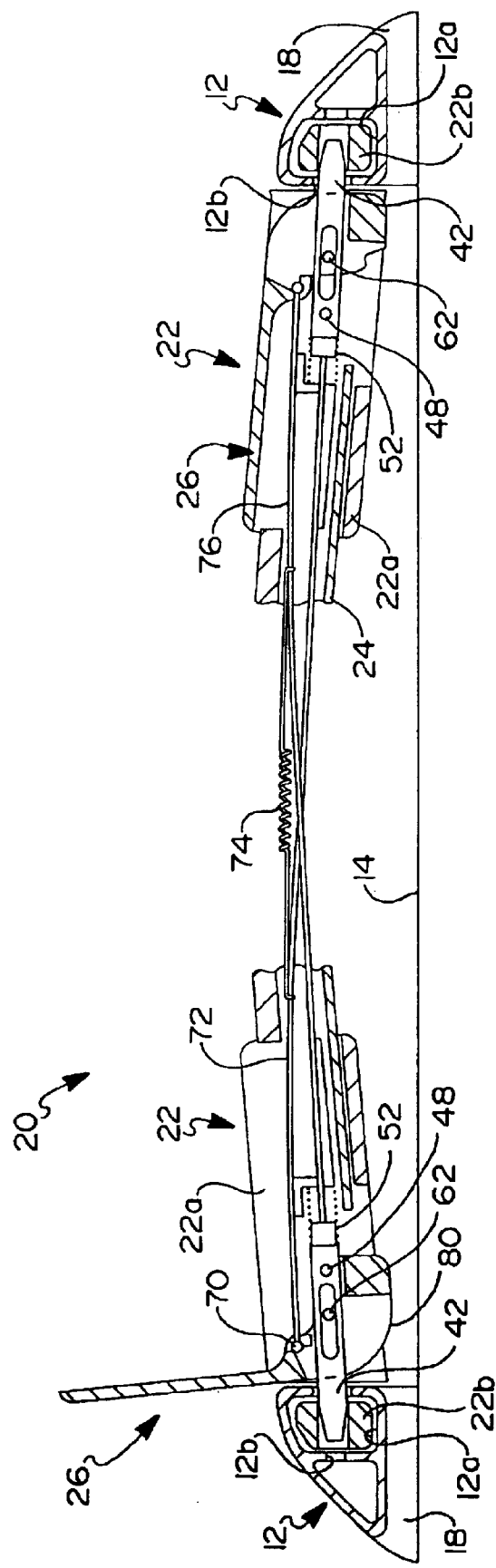
FIG. 6 is a view of the cross bar of FIG. 5 showing one of the actuating member in an unlocked position, and wherein the locking pin at each end support is unlocked from its respective siderail.

With specific reference to FIG. 6, the leftmost actuating member 26 is shown in its fully unlocked position. The post portions 48 of the locking pin 46 have been urged out of engagement with their respective openings 12b, thus causing the locking pins 42 to be retracted from their openings 12b. This has also caused the cable 72 to be placed under greater tension, which in turn urges the locking pin 42 of the rightmost end support 22 out of engagement with opening 12b of its associated siderail 12. Thus, the unlocking of each of the locking pins 42 is accomplished simultaneously with a single movement of one or the other of the actuating members 26. This unlocking action can be effected in the same manner if the right most actuating lever 26 in the drawing of FIG. 6 is lifted instead. Urging the left most actuating member 26 back into its locked position (FIG. 5) simultaneously causes both locking pins 42 to be urged back into engagement with the openings 12b in their associated siderails 12.

The cross bar of the present invention thus provides a pair of end supports 22 each having a construction which allows both end supports to be simultaneously locked or unlocked from their respective siderails 12, and importantly without requiring significant clearance between the end supports 22 and the outer body surface of a the vehicle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An article carrier for supporting articles above an outer body surface of vehicle, said article carrier comprising:

a pair of support rails adapted to be secured to said outer body surface generally parallel to one another and in spaced apart relation to one another, each said support rail forming a channel;

at least one cross bar having a length sufficient to span between said support rails, said cross bar having a pair of opposing ends with a locking mechanism disposed at each one of said opposing ends, each said locking mechanism including:

a housing for engaging with said channel of an associated one of said support rails;

an actuating member having a manually engageable portion for facilitating engagement of said actuating member with at least one finger of an individual, a camming surface and an attachment portion, said actuating member being pivotally mounted on said housing such that said manually engageable portion can be rotated, thereby causing rotating of said actuating member without said actuating member interfering with said outer body surface;

a locking component disposed for linear movement within said housing and including a cam follower surface for engaging with said camming surface of said actuating member, said camming surface operating to urge said locking component linearly out of engagement with said associated one of said support rails when said actuating member is moved to an unlocked position;

a biasing member for urging said locking component into locking engagement with said associated one of said support rails when said actuating member is placed in a locked position;

an elongated coupling system extending within said cross bar for coupling each one of said actuating members with a respective one of said locking components disposed at an end of said cross bar opposite to its respective said actuating member; and wherein movement of one of said actuating members from said locked to said unlocked positions causes a generally simultaneous movement of both of said locking components, thereby disengaging both of said locking components from their respective said support rails generally simultaneously.

2. The article carrier of claim 1, wherein said cam follower surface of said locking component comprises a post extending generally transversely of a longitudinal axis of said locking component.

3. The article carrier of claim 1, wherein said cam follower surface of said locking component comprises a pair of posts extending in opposite directions from one another; and wherein said camming surface of said actuating member comprises a pair of spaced apart curved surfaces for engaging with said pair of posts.

4. The article carrier of claim 1, wherein said elongated coupling system comprises first and second cable lengths; and wherein said article carrier further comprises a pair of central biasing elements disposed within said cross bar at an approximate midpoint of each of said first and second cable lengths.

5. The article carrier of claim 1, wherein said locking component includes an elongated slot; and wherein said housing includes a pivot pin extending through said elongated slot for pivotally supporting said actuating member within said housing, said elongated slot enabling said locking component to be moved linearly within said housing while said actuating member is in said locked position.

6. An article carrier for supporting articles above an outer body surface of vehicle, said article carrier comprising:

a pair of support rails adapted to be secured to said outer body surface generally parallel to one another and in spaced apart relation to one another, each said support rail forming a channel;

at least one cross bar having a length sufficient to span between said support rails, said cross bar having a pair of opposing ends with a locking mechanism disposed at each one of said opposing ends, each said locking mechanism including:

a housing for engaging with said channel of an associated one of said support rails and moveable along said channel, said housing having a recess formed in an outer surface thereof;

an actuating member having a manually engageable lever for facilitating engagement of said actuating member with at least one finger of an individual, a camming surface and an attachment portion;

a pivot pin disposed in said housing for supporting said actuating member for pivotal movement relative to said housing;

said lever being rotatable about said pivot pin, thereby causing rotation of said actuating member without said actuating member interfering with said outer body surface;

a locking component disposed for linear movement within said housing and including a cam follower surface for engaging with said camming surface of said actuating member, said camming surface operating to urge said locking component linearly out of engagement with said associated one of said support rails when said actuating member is moved to an unlocked position;

a biasing member for urging said locking component into locking engagement with said associated one of said support rails when said actuating member is placed in a locked position;

said actuating member being disposed within said recess when in said locked position and said lever projecting outwardly of said housing when said actuating member is in said locked position;

a pair of cables extending within said cross bar for coupling each of said actuating members to a respective one of said locking components disposed at an end of said cross bar opposite to its associated said actuating member and wherein movement of one of said actuating members from said locked position to said unlocked position causes a generally simultaneous movement of said locking component at the other one of said actuating members, thereby disengaging both of said locking components from their respective said support rails generally simultaneously.

7. The apparatus of claim 6, wherein each said cable is comprised of first and second sections coupled together by a central biasing element.

8. The apparatus of claim 6, wherein said cam follower surface comprises a post extending generally transversely of a longitudinal axis of said locking component.

9. The apparatus of claim 6, wherein said cam follower surface comprises a pair of posts extending transversely of said locking component.

10. The apparatus of claim 6, wherein said locking component includes an elongated slot for receiving said pivot pin therethrough, said elongated slot enabling linear movement of said locking component within said housing without interference from said pivot pin.

11. A cross bar adapted to be used with a pair of support rails, where the support rails are secured to an outer body surface of a vehicle, for supporting articles thereon above said outer body surface, said cross bar comprising:

a tubular portion having opposite end portions:

a housing disposed at each of said opposite end portions;

each said housing including:

a pivotally mounted actuating member mounted therein and moveable between a locked position and an unlocked position, said actuating member having a first camming surface;

a locking component disposed for linear movement therein and adapted to engage a respective one of said support rails to lock its associated said housing at a specific position along its associated said support rail, said locking component including a second camming surface engageable with said first camming surface to enable said locking component to be cammingly urged linearly into engagement with its respective said support rail when said actuating member is moved into said locked position, and moved out of locking engagement with said associated support rail when said actuating member is moved into said unlocked position;

a biasing element for urging said locking component into engagement with said associated support rail when said actuating member is urged into said locked position;

a pair of elongated coupling elements for connecting each said actuating member with said locking component disposed at an opposite one of said housings; and wherein movement of one of said actuating members into said locked position causes said locking component within each of said housings to be urged substantially simultaneously into engagement with their associated said support rails, thereby permitting said cross bar to be repositioned along said support rails; and wherein movement of one of said actuating members into said locked position causes both of said locking components to be urged substantially simultaneously into engagement with its associated said support rail.

12. The cross bar of claim 11, wherein each said elongated coupling element comprises a cable having first and second sections coupled together by a central biasing element, said central biasing element operating to maintain said cable taut between said actuating member and said locking member between which it is coupled.

13. The cross bar of claim 11, wherein each said locking component includes an elongated slot through which said pivot pin of its associated said housing projects, to thereby permit linear as well as pivoting movement of said actuating member.

14. The cross bar of claim 11, wherein said locking component is disposed within said housing so as to be concealed regardless if said actuating member is in said locked position or said unlocked position.

15. An article carrier for supporting articles above an outer body surface of vehicle, said article carrier comprising:

a pair of support rails adapted to be secured to said outer body surface generally parallel to one another and in spaced apart relation to one another, each said support rail having an attachment area;

at least one cross bar having a length sufficient to span between said support rails, said cross bar having a pair of opposing ends with a locking mechanism disposed at each one of said opposing ends, each said locking mechanism including:

a housing for engaging with said attachment area of an associated one of said support rails;

an actuating member having a manually engageable portion for facilitating engagement of said actuating member with at least one finger of an individual, a camming surface and an attachment portion, said actuating member being pivotally mounted on said housing such that said manually engageable portion can be rotated, thereby causing rotating of said actuating member without any portion of said actuating member interfering with said outer body surface;

a locking element disposed for movement within said housing and including a cam follower surface for engaging with said camming surface of said actuating member, said camming surface operating to urge said locking element out of engagement with said associated one of said support rails when said actuating member is moved to an unlocked position;

a pair of elongated members extending co-extensively with said cross bar and each operatively coupled with one of said actuating members of one of said locking mechanisms and said locking element at the other of said locking mechanisms at an opposing end of said cross bar; and wherein movement of one of said actuating members from said locked to said unlocked positions causes a generally simultaneous movement of said locking element at the other one of said locking mechanisms to disengage both of said locking elements from their respective said support rails generally simultaneously.

16. The article carrier of claim 15, wherein said cam follower surface of said locking element comprises a post extending generally transversely of a longitudinal axis of said locking element.

17. The article carrier of claim 15, further comprising a biasing element disposed within each said locking mechanism for urging its associated said locking element into locking engagement with its associated said support rail.

18. The article carrier of claim 15, wherein each said support rail includes a plurality of spaced apart openings for engaging with its associated said locking element when said associated locking element is in said locked position.

19. The article carrier of claim 15, wherein each said locking mechanism further includes:

said actuating member being supported by a pivot pin from said housing; and said locking element includes a linear slot; and wherein said pivot pin extends through said linear slot so as not to interfere with movement of said locking element as said locking element is urged between said locked and unlocked positions by said actuating member.

20. The article carrier of claim 15, further comprising a biasing element coupled to each of said elongated members to take up slack in said elongated members.

21. The article carrier of claim 15, wherein said locking element comprises a locking pin.

22. The article carrier of claim 15, wherein:

said locking element comprises a locking pin having a slot formed therein;

said cam follower includes at least one laterally extending post projecting from said locking pin;

said actuating member is supported on said housing by a pivot pin;

said pivot pin extends through said slot when said locking mechanism is assembled; and said camming surface of said actuating member engages said at least one post when being moved to said unlocked position, to thus urge said locking pin out of locking engagement with its associated said support rail.

23. An article carrier for supporting articles above an outer body surface of vehicle, the article carrier comprising:

a pair of support rails adapted to be secured to said outer body surface generally parallel to one another and in spaced apart relation to one another, each said support rail having an attachment area;

at least one cross bar having a length sufficient to span between said support rails, said cross bar having a pair of opposing ends with a locking mechanism disposed at each one of said opposing ends, each said locking mechanism including:

a housing for engaging with said attachment area of an associated one of said support rails;

an actuating member having a manually engageable portion for facilitating engagement of said actuating member with at least one finger of an individual, a camming surface, and said actuating member being pivotally mounted on said housing such that said manually engageable portion can be rotated, thereby causing rotation of said actuating member without any portion of said actuating member interfering with said outer body surface;

a locking element disposed for movement within said housing towards and away from an associated one of said support rails, said camming surface operating to urge said locking element out of engagement with said associated one of said support rails when said actuating member is moved to an unlocked position;

a pair of elongated members extending co-extensively with said cross bar and each being coupled between a respective one of said actuating members of one of said locking mechanisms at one end of said cross bar and with said locking element at an opposite end of said cross bar; and wherein movement of one of said actuating members from said locked to said unlocked positions causes a generally simultaneous movement of said locking element at the other one of said locking mechanisms to thereby disengage both of said locking elements from their respective said support rails generally simultaneously.

24. A single sided releasable article carrier adapted to mounted on a surface of a motor vehicle, comprising:

a pair of elongated support rails adapted to be fixedly secured in spaced apart relation to one another on said surface of said motor vehicle, each said support rail including a plurality of spaced apart attachment portions;

a cross bar having a locking mechanism at each end thereof, said locking mechanism including:

a housing;

an actuating member pivotally supported on said housing, said actuating member including a camming surface and an attachment portion;

a locking element supported for movement within said housing and engageable with one of said plurality of attachment areas of an associated one of said support rails;

a pair of elongated coupling members extending co-extensively with said cross bar that operatively couple each said attachment portion to said locking element at opposite ends of said cross bar; and wherein rotational movement of said actuating member causes said locking element to be released from engagement with said one of said plurality of attachment areas while said elongated coupling member is generally simultaneously urged to release said locking element at the other one of said locking mechanisms.

* * * * *

UNITED STATES PATENT AND TRADEMARK OFFICE
CERTIFICATE OF CORRECTION

PATENT NO. : 6,779,696 B2
DATED : August 24, 2004
INVENTOR(S) : Aftanas et al.

It is certified that error appears in the above-identified patent and that said Letters Patent is hereby corrected as shown below:

Column 3,
Line 43, delete "for" and insert -- in place of --.

Column 8,
Line 13, "locked" should read -- unlocked --.

Column 10,
Line 35, after "to" insert -- be --.

Signed and Sealed this

First Day of February, 2005

JON W. DUDAS
*Director of the United States Patent and Trademark Office*